R. McGAHEY.
LOADED TRUCK COUNTING APPARATUS.
APPLICATION FILED JAN. 22, 1913.
1,074,002.  Patented Sept. 23, 1913.
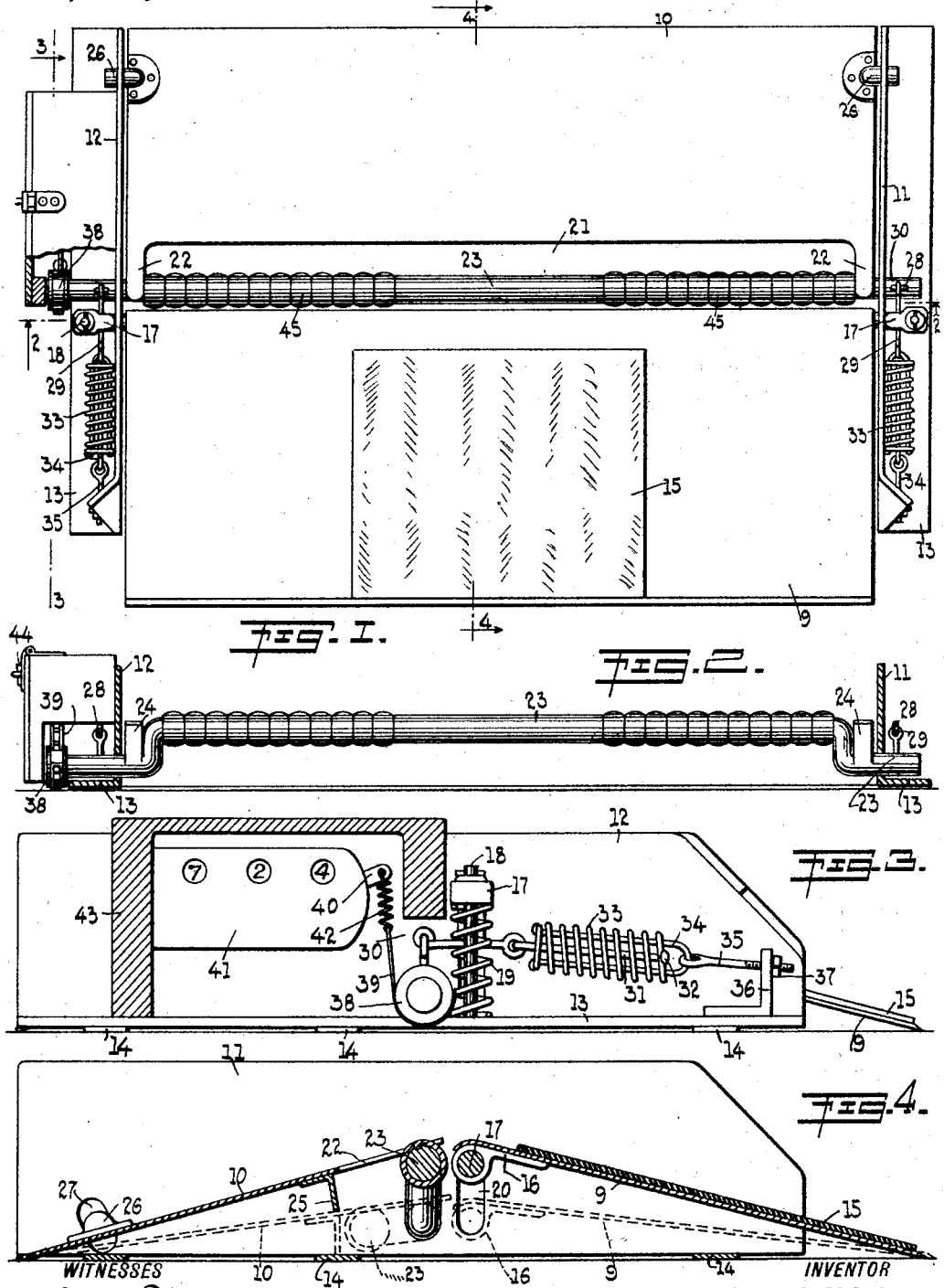

UNITED STATES PATENT OFFICE.

RICHARD McGAHEY, OF WALLA WALLA, WASHINGTON.

LOADED-TRUCK-COUNTING APPARATUS.

1,074,002. Specification of Letters Patent. Patented Sept. 23, 1913.

Application filed January 22, 1913. Serial No. 743,508.

*To all whom it may concern:*

Be it known that I, RICHARD MCGAHEY, a citizen of the United States, and a resident of Walla Walla, in the county of Walla Walla and State of Washington, have invented a new and Improved Loaded-Truck-Counting Apparatus, of which the following is a full, clear, and exact description.

The present invention more particularly relates to improvements in an apparatus of the character named, for which Letters Patent was granted to me under date of January 2, 1912, which Letters Patent bears No. 1,013,797, and to which cross reference is here made.

Among the principal objects which the present invention has in view are: To provide a counting mechanism which is positive in its operation and adapted to be affected only by a truck or similar vehicle when rolled thereover; to provide means whereby the counting mechanism with which the apparatus is provided is unaffected by the passage over said apparatus of the person operating the truck; and to simplify and cheapen the construction.

One embodiment of the present invention is shown in the accompanying drawings, in which—

Figure 1 is a top view of an apparatus of the character named, constructed and arranged in accordance with the present invention; Fig. 2 is a cross section taken on the line 2—2 in Fig. 1; Fig. 3 is a sectional elevation on an enlarged scale, taken on the line 3—3 in Fig. 2; Fig. 4 is a longitudinal vertical section, on an enlarged scale, taken on the line 4—4 in Fig. 2.

As seen in the accompanying drawings, platforms 9 and 10 are disposed between guide boards 11 and 12. The guide boards 11 and 12 are each provided with a horizontal flange 13, which flanges are connected by cross bars 14, to form a frame for the apparatus. The outer edges of each of the platforms 9 and 10 preferably rest upon the floor of the building in which the counter is employed.

The platforms 9 and 10 are serially arranged; that is, the platform 9 is arranged to receive the truck and the person attending the same. To provide against the slippage of the foot of the attendant, the platform 9 is provided with a foot-pad 15, as seen best in Fig. 2 of the drawings.

The inner end of the platform 9 is connected by clips 16 with the suspension bar 17. The ends of the bar 17 are squared, as seen in Fig. 3 of the drawings, and are perforated to receive a guide bolt 18. The ends of the bar 17 are supported in normally raised position by a spiral spring 19, which enfolds the bolt 18, as best seen in Fig. 3 of the drawings. The ends of the bar 17 extend through slots 20, one of which is formed in each of the guide boards 11 and 12. The bolts 18 are rigidly secured upon the flanges 13, which flanges also form a rest for the spiral springs 19. The inner edge of the platform 10 is cut away to form a recess 21 and side supporting arms 22. The depth of the recesses 21 is designed to permit the crank bar 23 to swing toward the platform 10 without impinging upon or interfering therewith.

The arms 22 normally support the platform 10 when lifted to the raised position as shown in Fig. 4 of the drawings. In this position, the crank bar 23 is vertically disposed, and the rests 24 thereon support said arms. When the platform 10 is disposed in the position shown in dotted lines in Fig. 4 of the drawings, as when a loaded truck is passing thereover, the platform is supported by the bracket bar 25, the lower edge whereof rests upon one of the cross bars 14.

The platform 10 is held in position by stud bolts 26, which protrude through the backwardly-inclined slots 27 formed in the guide boards 11 and 12. By thus inclining the slots 27, the platform 10 is permitted to yield to the impact of the truck upon the edge of the platform, while, when the truck passes over that portion of the platform immediately adjacent the bolts 26, so as to depress the same, the platform 10 is moved by the slots 27 toward the center of the apparatus or toward the crank bar 23.

The crank bar 23 is mounted in bearings formed in the guide boards 11 and 12. Extending upward from both ends of the bar 23 are eyelet bolts 28, through which are extended the ends of link rod 29. The opposite end of the rod 29 is connected with a yoke 31, the ends 32 whereof are overturned to grasp the last convolution of a coil spring 33. The yoke 31 corresponds with a yoke 34, the ends whereof are overturned in a manner similar to that described with reference to the ends 32, to seat the final convolution of the spring 33 at the opposite end thereof. The yoke 34 is held by an eye-bolt 35, which is anchored to a bracket 36 by means of a screw nut 37, the ends of said bolts being threaded to accommodate the nuts 37.

The operation of the rigging just above described, embodying the springs 33, normally holds the bar 23 in upright or lifted position, where the rests 24 support the platform 10 by means of the side arms 22 thereof. When, however, in the operation of the apparatus, the bar 23 is forced forward from the platform 9, the springs 33 yield to permit the bar to assume the position shown in Fig. 4 of the drawings.

Rigidly mounted upon one end of the bar 23 is a pulley 38, upon which is partially wound a flexible connector 39. The connector 39 operatively unites the pulley 38 with a lever 40 of a counting mechanism 41. To relieve uncalculated strains which might be transmitted through the connector 39, a spiral spring 42 is interposed between said connector and the lever 40.

The counting mechanism 41 is of any usual and approved construction. There is provided for said counting mechanism a case or housing 43, the cover of which is secured by a lock 44.

The character of truck for which the construction shown in the drawings is more particularly designed is that which has two carrying wheels. To receive the impact of said wheels, the bar 23 is furnished with a series of rollers 45. The rollers 45, by turning, avoid the tendency which exists, of the wheels of the truck rolling over and upon the bar 23. The action desired to be produced upon the bar 23 is to push the same forward until the wheels come in contact with the edge of the platform 10.

Having thus described my invention, I claim as new and desire to secure by Letters Patent:—

1. In an apparatus of the character named, the combination of a plurality of parallel, juxtaposed, serially-arranged platforms; a plurality of yielding supports for said platforms; a crank member intermediate said platforms, to be rocked by a passing truck; rigid supports for the second of said platforms, operable by said crank member to lower said second platform in correspondence with the other platform; and a counting mechanism operatively connected with said crank member, to register the number of operations thereof.

2. In an apparatus of the character named, the combination of a plurality of parallel, juxtaposed, serially-arranged platforms; a plurality of yielding supports for said platforms; a crank member intermediate said platforms, to be rocked by a passing truck; rigid supports for the second of said platforms, operable by said crank member to lower said second platform in correspondence with the other platform; a counting mechanism operatively connected with said crank member, to register the number of operations thereof; and side boards for said platform.

3. In an apparatus of the character named, the combination of a rotary crank member; yielding means for normally maintaining said member vertically disposed; a platform supported by said member, to be lowered thereby to receive a truck after the same has passed over said crank member; and a counting mechanism operatively connected with said crank member to register the operations thereof.

4. In an apparatus of the character named, the combination of a rocking member; resilient means for holding said member normally vertically disposed; guide members disposed adjacent the ends of said member and provided at a point removed from said member with upwardly and outwardly inclined slots; a platform mounted between said guide members, one edge whereof is supported by said rocking member, to be lowered and raised therewith; anchoring devices rigidly mounted on said platform to extend through said slots, to rock said platform; and a counting mechanism operatively connected with anchoring devices, to register the operations thereof.

In testimony whereof I have signed my name to this specification in the presence of two subscribing witnesses.

RICHARD McGAHEY.

Witnesses:
H. B. M. McDermott,
D. E. Hunter.

---

Copies of this patent may be obtained for five cents each, by addressing the "Commissioner of Patents, Washington, D. C."